United States Patent
Li et al.

(10) Patent No.: US 7,240,484 B2
(45) Date of Patent: Jul. 10, 2007

(54) EXHAUST TREATMENT SYSTEMS AND METHODS FOR USING THE SAME

(75) Inventors: Bob X. Li, Grand Blanc, MI (US); Mark D. Hemingway, Columbiaville, MI (US); Joseph V. Bonadies, Clarkston, MI (US); Joachim Kupe, Davisburg, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/282,220

(22) Filed: Nov. 17, 2005

(65) Prior Publication Data

US 2006/0075743 A1   Apr. 13, 2006

Related U.S. Application Data

(63) Continuation-in-part of application No. 11/022,501, filed on Dec. 22, 2004.

(60) Provisional application No. 60/533,005, filed on Dec. 29, 2003.

(51) Int. Cl.
  *F01N 3/00*   (2006.01)
  *F01N 3/10*   (2006.01)
(52) U.S. Cl. .............. 60/286; 60/287; 60/299; 60/301
(58) Field of Classification Search ............ 60/286, 60/287, 299, 301
  See application file for complete search history.

(56) References Cited

U.S. PATENT DOCUMENTS

| | | | |
|---|---|---|---|
| 6,176,078 B1 * | 1/2001 | Balko et al. .......... | 60/274 |
| 6,334,986 B2 * | 1/2002 | Gieshoff et al. ...... | 423/239.1 |
| 6,363,716 B1 * | 4/2002 | Balko et al. .......... | 60/286 |
| 6,365,118 B1 | 4/2002 | Kharas et al. ........ | 423/213.2 |
| 6,423,190 B2 | 7/2002 | Hemingway et al. ... | 204/164 |
| 6,464,945 B1 | 10/2002 | Hemingway ........... | 422/174 |
| 6,482,368 B2 | 11/2002 | Hemingway et al. ... | 422/186.04 |

(Continued)

FOREIGN PATENT DOCUMENTS

EP   0 773 354 B1   10/2001

(Continued)

OTHER PUBLICATIONS

JP Patent No. JP406117224A, Publication Date: Apr. 26, 1994, Abstract Only, 1 page.

(Continued)

*Primary Examiner*—Thomas Denion
*Assistant Examiner*—Loren Edwards
(74) *Attorney, Agent, or Firm*—Paul L. Marshall

(57) ABSTRACT

In one embodiment, an exhaust treatment system comprises a selective catalytic reduction device, an off-line reformer disposed in selective fluid communication with and upstream of the selective catalytic reduction device, and a plasma reactor disposed downstream of and in fluid communication with the off-line reformer, and disposed upstream of and in fluid communication with the selective catalytic reduction device. The selective catalytic reduction device is capable of storing ammonia and of enabling the reaction of the ammonia with NOx. The reformer is capable of producing a reformate comprising hydrogen and nitrogen. The plasma reactor is capable of producing ammonia from the reformate, and is a thermal plasma reactor or a surface discharge non-thermal plasma reactor.

11 Claims, 1 Drawing Sheet

U.S. PATENT DOCUMENTS

| | | |
|---|---|---|
| 6,560,958 B1 | 5/2003 | Bromberg et al. ............. 60/275 |
| 6,638,484 B2 | 10/2003 | Nelson et al. ......... 422/186.04 |
| 6,662,552 B1 * | 12/2003 | Gunther et al. ............... 60/286 |
| 6,810,658 B2 * | 11/2004 | Kaupert et al. ............... 60/274 |
| 7,043,902 B2 * | 5/2006 | Nakanishi et al. ............ 60/274 |
| 2001/0041153 A1 | 11/2001 | Benz .......................... 422/169 |
| 2002/0073692 A1 | 6/2002 | Katashiba et al. ............. 60/275 |
| 2003/0150709 A1 | 8/2003 | LaBarge et al. ............ 204/164 |
| 2003/0182930 A1 | 10/2003 | Goulette et al. .............. 60/275 |
| 2003/0209011 A1* | 11/2003 | Duvinage et al. ............. 60/286 |
| 2003/0221360 A1 | 12/2003 | Brown et al. ................. 44/301 |
| 2003/0226350 A1* | 12/2003 | Liu ............................. 60/275 |
| 2004/0237507 A1* | 12/2004 | Duvinage et al. ............. 60/276 |

FOREIGN PATENT DOCUMENTS

| | | |
|---|---|---|
| EP | 1 023 935 B1 | 6/2004 |
| JP | 6-117224 | 4/1994 |
| JP | 06-336914 | 12/1994 |
| WO | WO 02/094420 A1 | 11/2002 |
| WO | WO 02/100519 A1 | 12/2002 |
| WO | WO 03/009925 A1 | 2/2003 |

OTHER PUBLICATIONS

EP Patent No. EP1023935, Publication Date: Aug. 2, 2000, Abstract Only, 1 page.

* cited by examiner

EXHAUST TREATMENT SYSTEMS AND METHODS FOR USING THE SAME

CROSS REFERENCE TO RELATED APPLICATION

The present application is a continuation-in-part application of U.S. patent application Ser. No. 11/022,501 filed Dec. 22, 2004, which claims priority to Provisional U.S. Patent Application No. 60/533,005 filed Dec. 29, 2003, which are each hereby incorporated by reference in their entirety.

BACKGROUND

Up coming emission regulations for diesel engines are driving original equipment manufacturers (OEMs) to incorporate after treatment devices, e.g., exhaust treatment devices, into the exhaust systems in order to comply with these regulations. Examples of exhaust treatment devices include: catalytic converters (e.g., three-way catalyst, oxidation catalysts, selective catalytic reduction (SCR) catalysts, and the like), evaporative emissions devices, scrubbing devices (e.g., hydrocarbon (HC), sulfur, and the like), particulate filters/traps, adsorbers/absorbers, plasma reactors (e.g., non-thermal plasma reactors and thermal plasma reactors), and the like.

A major challenge in meeting the future diesel emission requirements is treating the oxides of nitrogen ($NO_x$) due to the inherently lean exhaust air-to-fuel ratio. One method of treating the $NO_x$ is the use of SCR catalysts that use ammonia as the reducing agent. Ammonia can be produced on-board a vehicle by injecting aqueous urea into the hot exhaust gas, upstream of the SCR catalyst. The urea decomposes to ammonia in the exhaust system and is absorbed by the SCR catalyst. The ammonia then reduces the $NO_x$ to nitrogen ($N_2$) in the presence of the catalyst.

A major drawback of the urea SCR system is the requirement to carry a second fluid, urea, on the vehicle in addition to diesel fuel. In addition, a nationwide urea distribution network must be established and maintained to provide a reliable supply to vehicle operators. Thus, a method to generate ammonia on-board the vehicle, using the available diesel fuel is highly desirable to vehicle manufacturers and operators.

SUMMARY

Disclosed herein are exhaust treatment systems and methods of using the same.

In one embodiment, an exhaust treatment system comprises a selective catalytic reduction device, an off-line reformer disposed in selective fluid communication with and upstream of the selective catalytic reduction device, and a plasma reactor disposed downstream of and in fluid communication with the off-line reformer, and disposed upstream of and in fluid communication with the selective catalytic reduction device. The selective catalytic reduction device is capable of storing ammonia and of enabling the reaction of the ammonia with NOx. The reformer is capable of producing a reformate comprising hydrogen and nitrogen. The plasma reactor is capable of producing ammonia from the reformate, and is a thermal plasma reactor or a surface discharge non-thermal plasma reactor.

One embodiment of a method of operating an exhaust treatment system comprises: producing a reformate comprising hydrogen and nitrogen, introducing the reformate to a plasma reactor, wherein the plasma reactor is a thermal plasma reactor or a surface discharge non-thermal plasma reactor, reacting the reformate in the plasma reactor to form an effluent comprising ammonia, and introducing the effluent to a selective catalytic reduction device.

The above-described and other features will be appreciated and understood from the following detailed description, drawing, and appended claims.

BRIEF DESCRIPTION OF THE DRAWINGS

Refer now to the figure, which is an exemplary embodiment.

DETAILED DESCRIPTION

Figure 1:
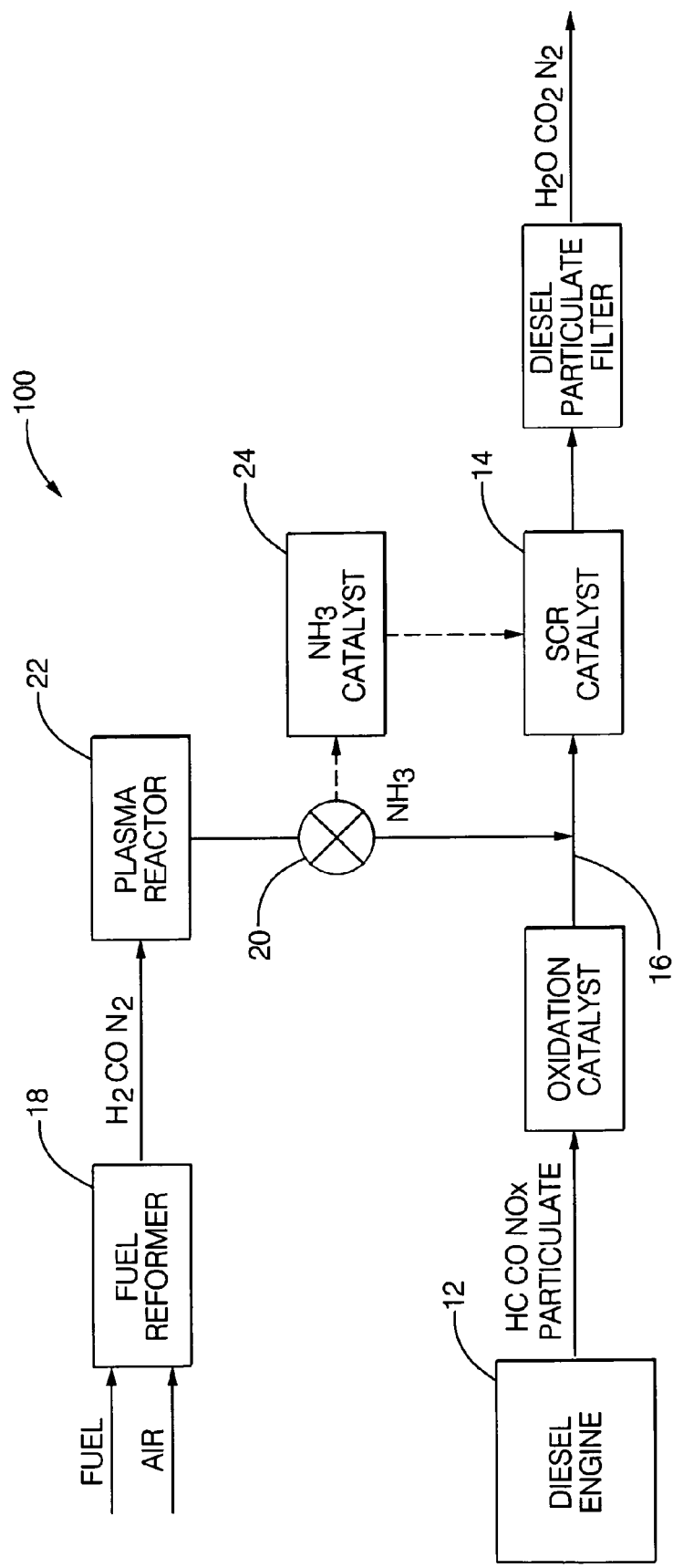
FIG. 1 is a schematic illustration of one embodiment of a $NO_x$ abatement system.

Disclosed herein are on-board $NO_x$ abatement system(s) and method(s) for their use, which are capable of being employed in both heavy-duty applications (e.g., highway tractors, trucks, and the like) and light-duty applications (e.g., passenger cars, and the like). More particularly, it has been discovered that a reformer can be employed to produce reformate for use in a plasma reactor (e.g., a thermal plasma reactor, a non-thermal plasma reactor (such as with surface discharge reactor), and so forth) to produce ammonia. The ammonia can be utilized within a selective catalytic reduction (SCR) device to reduce $NO_x$ generated by internal combustion systems (e.g., compression ignition (diesel) engines, spark ignition engines, and the like).

It should first be noted that the terms "a" and "an" herein do not denote a limitation of quantity, but rather denote the presence of at least one of the referenced items. The suffix "(s)" as used herein is intended to include both the singular and the plural of the term that it modifies, thereby including one or more of that term (e.g., the material(s) includes one or more materials). The term "on-board" is used herein to refer to the production of a given component within a vehicle (e.g., automobile, truck, and the like) system. Further, while all embodiments disclosed herein can be employed to produce "on-board" ammonia and/or reformate, the system components (e.g., devices) can be referred to as being "in-line" or "off-line" for ease in discussion. An "in-line" device refers generally to a device disposed downstream of and in fluid communication with an exhaust gas source, wherein the "in-line" device is in the exhaust flow stream (e.g., capable of receiving a continual flow of exhaust gas during operation). An "off-line" device refers generally to a device disposed upstream of an exhaust gas conduit such that the "off-line" device is capable of introducing fluid to the exhaust gas conduit, but does not receive gas from the exhaust source. However, embodiments are envisioned where an "off-line" component can periodically become and "in-line" component, e.g., when exhaust gas is recycled to the component.

Refer now to FIG. 1 that illustrates an exemplary $NO_x$ abatement system 100 (hereinafter referred to as "system 100"). While the location, number, and size, of each component can vary depending on the application, this figure provides a starting point for discussion. The system 100 can comprise an exhaust gas source 12 disposed upstream of and in fluid communication with an in-line SCR device 14 via an exhaust conduit 16. Disposed in selective fluid communication with the exhaust conduit 16 can be an off-line reformer 18, which can be disposed upstream of, and in fluid communication with, an off-line plasma reactor 22. An optional ammonia catalyst device 24 can be disposed upstream (not shown) and/or downstream of the plasma reactor 22. The reformer 18 and plasma reactor 22 can be disposed in selective communication with the SCR device 14 via valve 20. The ammonia catalyst device 24 can receive effluent from plasma reactor 22 via valve 20, and/or can receive effluent directly from plasma reactor 22 and introduce the stream exiting the ammonia catalyst device 24 to the SCR device 14 via valve 20 (not shown).

Exhaust gas source 12 can include compression ignition engines, spark ignition engines, and so forth. In a particular embodiment, the exhaust gas source 12 can be a compression ignition engine operating with diesel fuel (e.g., a diesel engine). However, it is to be understood the other fuel sources can be employed. Examples of possible fuel sources include hydrocarbon fuels (such as gasoline, diesel, ethanol, methanol, kerosene, and the like; gaseous fuels, such as natural gas, propane, butane, and so forth), and alternative fuels (such as hydrogen, biofuels, dimethyl ether, and so forth), as well as combinations comprising at least one of the foregoing fuels.

The SCR device 14 is an in-line component of system 100 disposed in fluid communication with the exhaust gas source 12 and is in fluid communication (e.g., selective fluid communication) with the reformer 18, the plasma reactor 22, and/or the ammonia catalyst devices 24. While fluid flow is illustrated in FIG. 1 as flowing in series from the reformer 18 to the plasma reactor 22 and optionally to the ammonia catalyst device 24, it is to be understood that effluent from any of the foregoing devices can, individually, be introduced (e.g., injected) into the SCR device 14 depending on the desired application. For example, in various embodiments, it can be advantageous to introduce effluent from the reformer 18 (i.e., reformate) to the SCR device 14 to increase the temperature thereof (e.g., during start-up conditions).

Reformate from the reformer 18 is supplied to the plasma reactor 22 and optionally to an ammonia catalyst device 24 to produce ammonia. The ammonia is introduced (e.g., periodically) into the SCR device 14 to regenerate the SCR device 14. The SCR device 14 can be capable of storing reducing agent(s) in the form of ammonia, ammonium hydroxide, and so forth, such that these reducing agent(s) can be reacted with $NO_x$ in the exhaust stream to produce nitrogen gas ($N_2$) and water ($H_2O$). Examples of possible reactions are as follows:

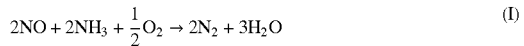

(I)

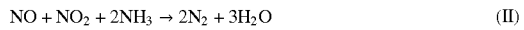

(II)

For example, a controller (not shown), in operable communication with sensor(s), valve(s), and so forth, can be programmed such that the SCR device 14 is regenerated as needed. More particularly, in system 100, the controller can be programmed to introduce ammonia to the SCR device 14 (e.g., directly to the SCR device 14 and/or to the exhaust conduit 16) based upon $NO_x$ slip (i.e., the $NO_x$ remaining in the exhaust fluid after exiting a system component, e.g., SCR device 14), engine schedule, time, and/or a combination comprising at least one of the foregoing. For example, by manipulating valve 20, ammonia can be introduced into the ammonia catalyst device and/or into the exhaust conduit 16, as desired.

The SCR device 14 comprises a substrate disposed within a housing. Catalytic metal(s), support material(s), and ammonia ($NH_3$) trapping material(s) are disposed on/throughout/in (hereinafter "on") the substrate. The catalytic metal, support material, and ammonia ($NH_3$) trapping material are disposed on the substrate by any suitable method (e.g., washcoated, imbibed, impregnated, physisorbed, chemisorbed, precipitated, and/or otherwise applied to the substrate).

Substrates for the SCR device 14 comprise a material designed for use in the environment produced by the exhaust gas source 12 (e.g., a spark ignition engine or a diesel engine). For example, a substrate having the following characteristics: (1) capable of operating at temperatures up to about 600° C., and up to about 1,200° C. for some applications, depending upon the location of the device within the exhaust system (e.g., close coupled, underfloor) and the type of system (e.g., gasoline or diesel); (2) capable of withstanding exposure to hydrocarbons, nitrogen oxides, carbon monoxide, particulate matter (e.g., soot, and so forth), carbon dioxide, sulfur, and others that may be present within the exhaust stream; and (3) having sufficient surface area and structural integrity to support catalyst(s), oxygen storage material(s), and/or trapping material(s), and so forth. Some substrate materials include cordierite, silicon carbide, metal, metal oxides (e.g., alumina, and so forth), glasses, and so forth, and combinations comprising at least one of the foregoing materials. These materials can be in the form of foils, mat, fibrous material, monoliths (e.g., a honeycomb structure, and the like), other porous structures (e.g., porous glasses, sponges), foams, pellets, particles, molecular sieves, and so forth (depending upon the particular device), and combinations comprising at least one of the foregoing forms.

Examples of catalytic materials for the SCR device 14 include platinum, palladium, ruthenium, rhodium, iridium, gold, and silver, as well as oxides comprising at least one of the foregoing, alloys comprising at least one of the foregoing, and mixtures comprising at least one of the foregoing metals. Catalyst support materials for the SCR device 14 include aluminum oxide (e.g., gamma aluminum oxide, delta aluminum oxide, theta aluminum oxide, and so forth), titanium oxides, zirconium oxides, yttrium oxides, lanthanum oxides, cerium oxides, scandium oxides, and so forth, as well as combinations comprising at least one of the foregoing. These support materials can optionally be stabilized, e.g., with barium, yttrium, strontium, calcium, a lanthanum group metal, and so forth, as well as oxides comprising at least one of the foregoing, and combinations comprising at least one of the foregoing; e.g., yttria stabilized zirconia.

Suitable $NH_3$ trapping materials include vanadium oxides, niobium oxides, molybdenum oxides, tungsten oxides, rhenium oxides, and so forth, and combinations comprising at least one of the foregoing. Suitable SCR devices include, but are not limited to, those devices disclosed in International Application No. PCT/US04/04093 (Published Application No. WO2004/071646) to Kupe et al.

Turning now to the reformer 18, the reformer 18 can be an off-line component of the system 100, which is disposed in fluid communication with the plasma reactor 22, the exhaust conduit 16, and optionally an ammonia catalyst device 24. In addition, embodiments are envisioned where exhaust gas recycle (EGR) can be recycled to the reformer 18, thereby making the reformer a periodic "in-line" component of the system 100. The reformer 18 can generate reformate comprising primarily hydrogen ($H_2$), nitrogen ($N_2$; inert gas from air that was initially feed to reformer 18), and carbon monoxide (CO), along with byproducts (e.g., methane ($CH_4$), carbon dioxide ($CO_2$), water ($H_2O$), and so forth). The reformer 18 can be configured for partial oxidation reforming, steam reforming, dry reforming, and/or the like. In one embodiment, reformer 18 can be configured primarily for partial oxidation reforming wherein a diesel fuel and air are employed. However, it is noted that steam reforming and dry reforming can also occur to the extent of that water and carbon dioxide are contained in the air and fuel.

Partial oxidation reformers are based on sub-stoichiometric combustion conditions, which achieve temperatures sufficient to reform the fuel. Chemical "decomposition" of the fuel to synthesis gas (i.e., a gas comprising principally hydrogen, carbon monoxide, and nitrogen) occurs through thermal reactions at high temperatures, e.g., about 700° C. to about 1,000° C. Catalysts have been demonstrated with partial oxidation systems (catalytic partial oxidation) to promote conversion of various fuels into synthesis gas. The use of a catalyst can result in acceleration of the reforming reactions and can provide this effect at lower reaction temperatures than those that would otherwise be needed in the absence of a catalyst. An example of the partial oxidation reforming reaction is as follows:

$$CH_4 + \tfrac{1}{2}O_2 \rightarrow CO + 2H_2 + \text{heat} \tag{III}$$

Steam reforming involves the use of a fuel and steam ($H_2O$) that can be reacted in heated tubes filled with a catalyst(s) to convert the hydrocarbons into synthesis gas. The steam reforming reactions are endothermic, thus the steam reformers can be designed to transfer heat into the catalytic process. An example of the steam reforming reaction is as follows:

$$CH_4 + H_2O \rightarrow CO + 4H_2 \tag{IV}$$

Dry reforming involves the creation of synthesis gas in the absence of water, for example, using carbon dioxide as the oxidant. Dry reforming reactions, like steam reforming reactions, are endothermic processes. An example of the dry reforming reaction is depicted in the following reaction:

$$CH_4 + CO_2 \rightarrow 2CO + 2H_2 \tag{V}$$

Practical reformers can comprise a combination of these idealized processes. Thus, a combination of air, water, and/or recycled exhaust fluid can be used as the oxidant in the fuel reforming process.

Reformer 18 comprises a substrate disposed in a housing, wherein a catalyst metal and support material are disposed on the substrate. Suitable reformers 18 include, but are not limited to, those reformers disclosed in International Application No. PCT/US04/04093 (Published Application No. WO2004/071646) to Kupe et al.

The substrate of the reformer 18 is capable of operating at temperatures up to about 1,200° C.; capable of withstanding strong reducing environments in the presence of water containing, for example, hydrocarbons, hydrogen, carbon monoxide, water, oxygen, sulfur and sulfur-containing compounds, combustion radicals (such as hydrogen and hydroxyl ions, and so forth), and carbon particulate matter; and has sufficient surface area and structural integrity to support the desired catalyst metal and support material. Suitable materials that can be used as the substrate of the reformer 18 include, zirconium toughened aluminum oxide, titanium toughened aluminum oxide, aluminum oxide, zirconium oxide, titanium oxide, and so forth, as well as combinations comprising at least one of the foregoing materials.

Suitable catalytic metals that can be employed in the reformer 18 include those discussed above in relation to SCR device 14. In an embodiment, the catalyst metals for reformer 18 can comprise rhodium and platinum. Support materials for the reformer 18 can include hexaaluminates, aluminates, aluminum oxides (e.g., gamma-aluminum oxide, theta-aluminum oxide, delta-aluminum oxide), gallium oxides, zirconium oxides, and titanium oxides, and so forth, as well as combinations comprising at least one of the foregoing.

The plasma reactor 22 can be an off-line device disposed in fluid communication with the reformer 18. More particularly, the plasma reactor can be a thermal plasma reactor (e.g., a device, wherein the gas ionization temperature can be greater than about 1,000° C.), a surface discharge non-thermal plasma reactor (e.g., a device, wherein the gas ionization temperature is about room temperature (e.g., about 25° C. to about 27° C.)), and so forth. More particularly, the plasma reactor 22 can be capable of producing ammonia directly from reformate. More particularly, the plasma reactor 22 can produce ammonia directly from reformate in yields up to about 1% or so.

Without being bound by theory, it is to be understood that unlike systems and methods employing air alone (e.g., no reformate) to make ammonia in a plasma reactor 22 use greater energy to produce the same quantity of ammonia. Here, system 100 supplies reformate to the plasma reactor 22 for ammonia generation. Hence, reformate is generally supplied to the plasma reactor 22 at an elevated temperature (e.g., a temperature of about 700° C. to about 900° C.), which can reduce the amount of energy needed to bring the plasma reactor 22 up to, and sustain, a suitable operating temperature. This is advantageous as it reduces the reactors fuel consumption and overall operating costs. Furthermore, since the reformate primarily comprises hydrogen ($H_2$) and nitrogen ($N_2$), a greater percentage of the energy from the plasma reactor is employed in the production of ammonia. Systems that do not use the reformate, generally use air (supplied directly to the plasma reactor) as the nitrogen source. Since the air comprises components that are not employed in the reaction to product the ammonia (e.g., that are directly supplied with air comprising oxygen, argon, carbon dioxide, and other gaseous components), plasma energy not solely used to ionize nitrogen and hydrogen. In other words, direct production of ammonia from the reformate comprising the hydrogen and nitrogen is more efficient than the production of ammonia from air and a hydrogen source. For example, when plasma energy is employed solely to ionize nitrogen and hydrogen, the reactions occurring in the plasma reactor can be characterized by the following equations:

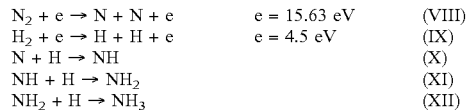

| | | |
|---|---|---|
| $N_2 + e \rightarrow N + N + e$ | $e = 15.63$ eV | (VIII) |
| $H_2 + e \rightarrow H + H + e$ | $e = 4.5$ eV | (IX) |
| $N + H \rightarrow NH$ | | (X) |
| $NH + H \rightarrow NH_2$ | | (XI) |
| $NH_2 + H \rightarrow NH_3$ | | (XII) |

In an embodiment, the plasma reactor 22 can be a surface discharge type non-thermal plasma reactor. For example, non-thermal plasma can be generated by several methods, such as electrical fields, electron beams, and/or irradiation with electromagnetic energy of appropriate intensity and wavelength (e.g., generated by electrical fields). Exemplary non-thermal plasma reactors are disclosed, for example, in U.S. Patent Publication Nos. 2003/0182930 A1 to Goulette et al., and 2003/0150709 A1 to LaBarge et al., U.S. Pat. Nos.

6,423,190, 6,464,945, and 6,482,368 to Hemingway et al., and U.S. Pat. No. 6,638,484 to Nelson et al., which are incorporated herein by reference.

The ammonia catalyst device 24 can be disposed upstream and/or downstream, and in fluid communication with, the plasma reactor 22. For example, as illustrated in FIG. 1 ammonia catalyst device 24 can be disposed downstream of the plasma reactor 22 and upstream of the SCR device 14. Without being bound by theory, a synergetic effect can be realized when at least one ammonia catalyst device is employed in combination with the plasma reactor 22 such that ammonia formation can be enhanced compared to utilizing the plasma reactor alone.

The ammonia catalyst device 24 can comprise an ammonia forming catalyst that can facilitate a reaction between hydrogen and nitrogen in the reformate to yield ammonia. More particularly, the ammonia catalyst device 24 can comprise a substrate, a catalyst metal(s), and catalyst support material, which can be similar to the elements discussed above with regards to SCR device 14 and reformer 18 (yet tailored for the desired reaction within the SCR device 14). For example, the catalyst metal support can comprise refractory oxides such as aluminum oxides, stabilized aluminum oxides such as barium stabilized aluminum oxide, zirconium, yttrium oxide rare earth oxides such as cerium, lanthanum, praseodymium, neodymium, and/or ytterbium oxide, transition metal oxides such as nickel, manganese, cobalt, copper, and/or iron oxide and engineered materials such as zeolites, as well as mixtures such as cerium-zirconium solid solutions and the like.

Various other exhaust treatment device(s) (e.g., catalytic converter(s), three-way reduction catalyst(s), oxidation catalyst(s), particulate filter(s), catalyzed particulate filter(s), $NO_x$ catalyst(s), $NO_x$ adsorber(s), sulfur scrubber, combinations comprising at least one of the foregoing, and so forth) can be disposed in fluid communication with the exhaust gas source 12. For example, an optional an oxidation catalyst (not shown) can be disposed downstream of an in fluid communication with SCR device 14, wherein the oxidation catalyst can be capable of oxidizing CO and $NH_3$ that can slip past SCR device 14. More particularly, this oxidation catalyst can be used, for example, to oxidize any carbon monoxide (CO), ammonia ($NH_3$), nitrous oxide ($N_2O$) and/or hydrogen sulfide ($H_2S$) passing through the SCR device 14 into carbon dioxide ($CO_2$), nitrogen ($N_2$), sulfur dioxide ($SO_2$), and water ($H_2O$).

Without being bound by theory, it is advantageously noted that by supplying reformate to a plasma reactor, ammonia is efficiently generated directly from the reformate in the plasma reactor. Use of the reformate reduces energy consumption in bringing the plasma reactor up to a suitable operating temperature and in producing the ammonia, which can reduce the overall cost of operation. Further, the embodiments disclosed herein allow for on-board generation of ammonia that can be used to regenerate a SCR device without the need for storing various reducing agents. As such, the systems disclosed herein can be employed in both heavy-duty applications and light duty applications.

Additionally, embodiments are also envisioned that can obviate the need for various exhaust treatment devices (e.g., a $NO_x$ adsorber device). Since additional exhaust treatment devices can increase the overall complexity and cost of a system, the system and method disclosed herein can provide a relatively simple and cost effective method for treating $NO_x$ while meeting emissions standards.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A exhaust treatment system, comprising:
a selective catalytic reduction device capable of storing ammonia and of enabling the reaction of the ammonia with NOx;
an off-line reformer disposed in selective fluid communication with and upstream of the selective catalytic reduction device, wherein the reformer is capable of producing a reformate comprising hydrogen and nitrogen;
a plasma reactor, disposed downstream of and in fluid communication with the off-line reformer, and disposed upstream of and in fluid communication with the selective catalytic reduction device, wherein the plasma reactor is capable of producing ammonia from the reformate, and wherein the plasma reactor is a thermal plasma reactor or a surface discharge non-thermal plasma reactor; and
an ammonia catalyst device disposed upstream and/or downstream of the plasma reactor, wherein the ammonia catalyst device is capable of catalytically producing ammonia.

2. The exhaust treatment system of claim 1, wherein the ammonia catalyst is disposed downstream of the plasma reactor.

3. The exhaust treatment system of claim 1, wherein the system does not employ a NOx adsorber.

4. The exhaust treatment system of claim 1, wherein the plasma reactor is a thermal plasma reactor.

5. The exhaust treatment system of claim 1, wherein the plasma reactor is a surface discharge, non-thermal plasma reactor.

6. The exhaust treatment system of claim 1, further comprising an in-line particulate filter disposed downstream of the selective catalytic reduction device.

7. The exhaust treatment system of claim 1, further comprising an in-line oxidation catalyst disposed upstream of the selective catalytic reduction device.

8. The exhaust treatment system of claim 1, wherein the plasma reactor and the ammonia catalyst device are separate components.

9. A method of operating an exhaust treatment system, comprising;
producing a reformate comprising hydrogen and nitrogen;
catalytically reacting a portion of the reformate to produce ammonia;
introducing the reformate to a plasma reactor, wherein the plasma reactor is a thermal plasma reactor or a surface discharge non-thermal plasma reactor;
reacting the reformate in the plasma reactor to form an effluent comprising ammonia; and
selectively controlling the effluent that is introduced to a selective catalytic reduction device.

10. A method of operating an exhaust treatment system, comprising;
producing a reformate comprising hydrogen and nitrogen;

introducing the reformate to a plasma reactor, wherein the plasma reactor is a thermal plasma reactor or a surface discharge non-thermal plasma reactor;

reacting the reformate in the plasma reactor to form an effluent comprising ammonia;

catalytically reacting hydrogen and nitrogen in the effluent to form additional ammonia; and selectively controlling the effluent that is introduced to a selective catalytic reduction device.

11. An exhaust treatment system, comprising:

a selective catalytic reduction device capable of storing ammonia and of enabling the reaction of the ammonia with NOx;

an off-line reformer disposed in selective fluid communication with and upstream of the selective catalytic reduction device, wherein the reformer is capable of producing a reformate comprising hydrogen and nitrogen;

a plasma reactor, disposed downstream of and in fluid communication with the off-line reformer, and disposed upstream of and in fluid communication with the selective catalytic reduction device, wherein the plasma reactor is capable of producing ammonia from the reformate, and wherein the plasma reactor is a thermal plasma reactor or a surface discharge non-thermal plasma reactor; and a valve disposed downstream of and in fluid communication with the plasma reactor for selectively introducing ammonia into the selective catalytic reduction device; and an ammonia catalyst device disposed downstream of the valve and upstream of the selective catalytic reduction device, wherein the valve selectively introduces ammonia into the ammonia catalyst device, and wherein the ammonia catalyst device is capable of catalytically producing ammonia.

* * * * *